United States Patent [19]

Förster

[11] Patent Number: 4,641,736
[45] Date of Patent: Feb. 10, 1987

[54] FRICTION CLUTCH

[75] Inventor: Andreas Förster, Schweinfurt, Fed. Rep. of Germany

[73] Assignee: Fichtel & Sachs AG, Schweinfurt, Fed. Rep. of Germany

[21] Appl. No.: 840,887

[22] Filed: Mar. 18, 1986

[30] Foreign Application Priority Data

Mar. 20, 1985 [DE] Fed. Rep. of Germany ....... 3510053

[51] Int. Cl.[4] .............................................. F16D 13/44
[52] U.S. Cl. .................................. 192/89 B; 192/70.27
[58] Field of Search ................ 192/89 B, 70.27, 70.25, 192/109 A, 109 B, 109 R, 89 R

[56] References Cited

U.S. PATENT DOCUMENTS 3,811,544  5/1974  Maucher ........................... 192/89 B
4,195,719  4/1980  Martinez ........................... 192/89 B
4,326,611  4/1982  Billet ................................ 192/70.27 X

FOREIGN PATENT DOCUMENTS 1929823  12/1970  Fed. Rep. of Germany .

Primary Examiner—Carl D. Friedman
Attorney, Agent, or Firm—Toren, McGeady and Goldberg

[57]  ABSTRACT

The friction clutch for a motor vehicle comprises a fly-wheel having a clutch cover on which a diaphragm spring is supported through retaining bolts. The retaining bolts axially displaceably pass through the diaphragm spring and the clutch cover and are secured on the side axially remote from the diaphragm spring on a plate spring which is supported on the clutch cover. The plate spring carries all retaining bolts and concentrically surrounds the rotation axis of the clutch. The plate spring ensures play-free clamping in of the diaphragm spring. The plate spring is preferably independently centered on the clutch cover so that the passage openings of the retaining bolts can be of such large dimensions that no friction occurs.

16 Claims, 8 Drawing Figures

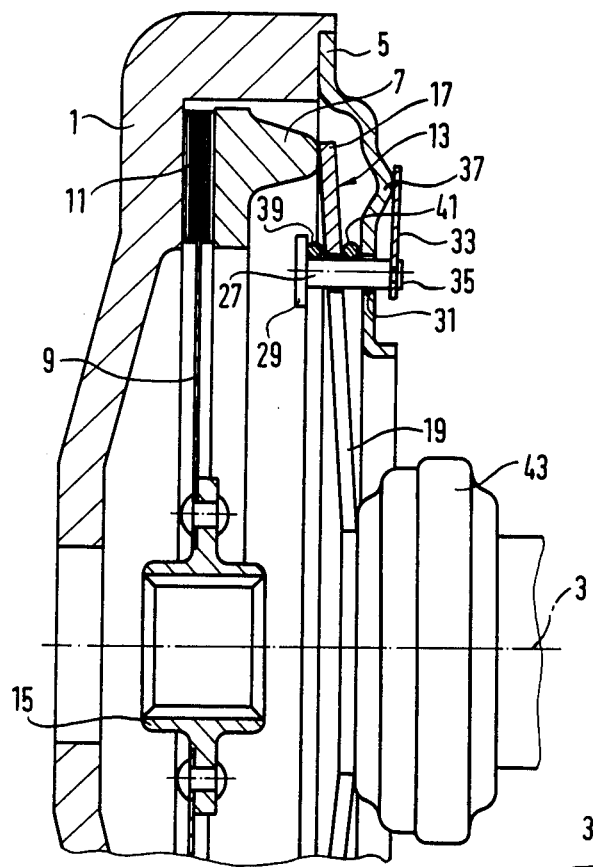
Fig. 1
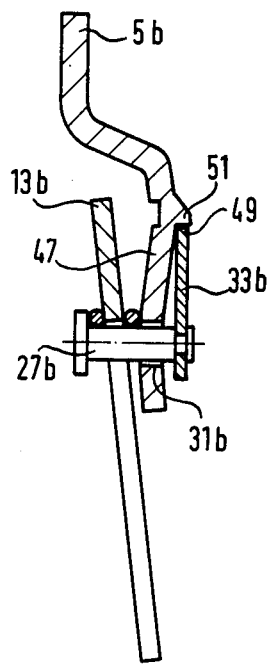
Fig. 4
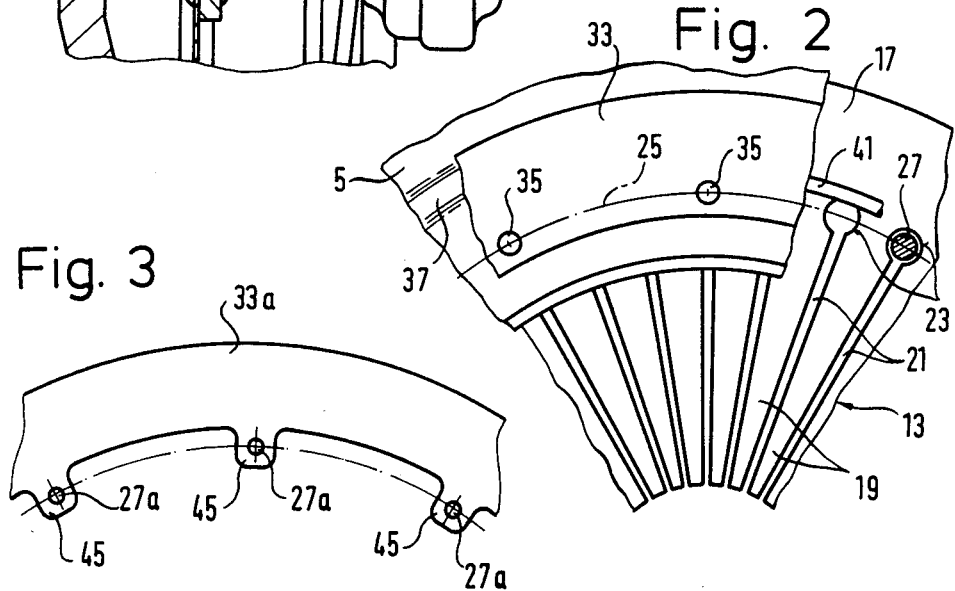
Fig. 2
Fig. 3

FRICTION CLUTCH

BACKGROUND OF THE INVENTION

The invention relates to a friction clutch, especially for motor vehicles.

From German Publication Specification No. 1,929,823 a friction clutch for motor vehicles is known, the clutch disc of which is clamped in by a diaphragm spring between a fly-wheel and a presser plate which is guided non-rotatably but axially movably in relation to the fly-wheel. The diaphragm spring has radially inwardly directed spring tongues and lies on the presser plate in the region of its external circumference. On a smaller diameter the diaphragm spring is supported through retaining bolts on the clutch cover. The retaining bolts are guided axially displaceably in mutually axially aligned openings of the diaphragm spring and the clutch cover, and are supported with a head on the side of the diaphragm spring directed axially towards the presser plate. On the side of the clutch cover axially remote from the presser plate each retaining bolt carries a separate dished spring which concentrically surrounds the retaining bolt and is secured by means of a circlip to the retaining bolt. The plurality of dished springs compensates axial play between the retaining bolt, the diaphragm spring, the clutch cover and wire rings inserted between these parts.

The invention is directed towards improvement of a friction clutch of the above-stated kind, as regards the supporting of its diaphragm spring on the clutch cover, so that the assembly expense is reduced and the friction clutch has maximum possible efficiency, that is to say as little as possible of the work to be expended for the actuation of the clutch is to be expended for compensating spring play or overcoming friction losses or the like.

SUMMARY OF THE INVENTION

The friction clutch according to the invention is what is called a "pressed-type" clutch in which the diaphragm spring is supported in the region of its external circumference on the presser plate and along a circle with smaller diameter through retaining bolts on the clutch cover. The retaining bolts are secured on a single, common, annular plate spring, for example a dished spring, or a diaphragm spring, which coaxially surrounds the rotation axis of the clutch. Since only one single plate spring is used to take up the play of all retaining bolts, the stress forces exerted upon the retaining bolts are equal. This leads to a more uniform loading of the clutch diaphragm spring and permits a better attuning of the spring force and the spring force course in the case of wear of the clutch diaphragm spring and the support elements co-operating therewith. The reduction of the individual parts of the friction clutch by use of a single plate spring simplifies assembly.

The retaining bolts pass through the diaphragm spring and the clutch cover and can be guided radially in the openings provided for the passage of the retaining bolts. However it has proved favorable if the retaining bolts are radially fixed in relation to the clutch cover not in the passage openings of the clutch cover but by means of the plate spring which in any case is supported on the clutch cover. Centering edges which center the plate spring in relation to the clutch cover can be formed by embossing or bending either on the clutch cover or on the plate spring. By passage openings of sufficiently large dimensions for the retaining bolts in the clutch cover and possibly the diaphragm spring the friction resistance of the retaining bolts can be substantially completely reduced and the efficiency of the clutch can be improved. To improve efficiency it has also proved advantageous if the retaining bolts extend substantially parallel with the rotation axis and are displaceable parallel with the axis. This can be achieved in a simple manner in that the plate spring in the stress condition is substantially flat, while the plane of the plate extends perpendicularly to the axis of rotation of the clutch. Even on a deflection of the spring by reason of wear of the clutch diaphragm spring the retaining bolts move substantially parallel to the rotation axis. The axially parallel orientation of the retaining bolts can however also be achieved in the case of plate springs of cone form in that the retaining bolts are secured on radially protruding tongues or tabs of the plate spring. Alternatively clearance openings can be provided around the securing points of the retaining bolts, enclosing only a part of the securing position.

The plate spring can be supported on the clutch cover radially inside or equally radially outside the circle of arrangement of the retaining bolts. The supporting radially within the circle of arrangement has the advantage that smaller and thus cheaper plate springs can be used.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described embodiments of the invention.

BRIEF DESCRIPTION OF THE DRAWINGS

In the drawings:

FIG. 1 shows a partial axial longitudinal section through a motor vehicle friction clutch;

FIG. 2 shows a partial lateral elevation of the friction clutch;

FIG. 3 shows a partial plan view of a variant of a plate spring usable in the clutch according to FIG. 1;

FIGS. 4 to 7 show partial sectional views of variants of a friction clutch similar to the clutch according to FIG. 1

DETAILED DESCRIPTION OF THE DRAWINGS

Figure 5:
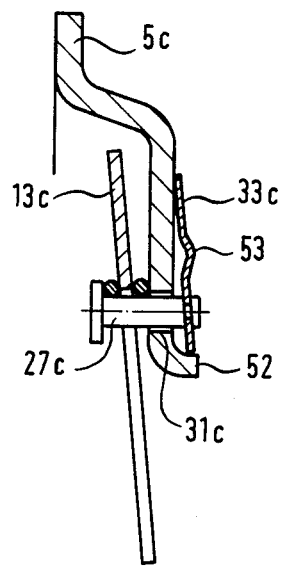

The motor vehicle friction clutch as represented in FIGS. 1 and 2 comprises a fly-wheel 1 which is secured on a crank-shaft (not shown further) which rotates about a rotation axis 3 and pertains to an internal combustion engine of the motor vehicle. A clutch cover 5 is secured, for example screwed, to the fly-wheel 1. An annular presser plate 7 which is guided non-rotatably but axially displaceably in relation to the fly-wheel 1 is arranged axially between the clutch cover 5 and the fly-wheel 1. The presser plate 7 can for this purpose be connected with the fly-wheel 1 for example through tangential straps which are secured to the clutch cover 5. A clutch disc 9, the friction linings 11 of which can be clamped in between the fly-wheel 1 and the presser plate 7 by a diaphragm spring 13, is arranged axially between the fly-wheel 1 and the presser plate 7. The clutch disc 9 has a hub 15 which is couplable non-rotatably but axially displaceably with an input shaft of the motor vehicle gearing.

The diaphragm spring 13 has substantially the form of an annular plate 17 which is supported in the region of its external circumference on the presser plate 7 and in the region of its internal circumference on the clutch cover 5. From the internal circumference of the plate part 17 a plurality of spring tongues 19 protrudes substantially radially inwards. The spring tongues 19 are separated from one another by slots 21 which widen at the base of the spring tongues 19 to foot openings 23. Several retaining bolts 27 arranged along the pitch circle 25 with spacing from one another and having a retaining head 29 on the side of the diaphragm spring 13 facing the presser plate 7 are seated substantially parallel with the rotation axis 3 in the foot openings 23. The retaining bolts 27 pass through openings 31 of the clutch cover 5 and are riveted, on the side of the clutch cover 5 axially remote from the diaphragm spring 13, on the common annular plate spring 33 concentrically enclosing the rotation axis 3, as indicated by rivet heads 35. In the example according to FIGS. 1 and 2 the retaining bolts 27 are secured in the region of the internal circumference of the plate spring 33, while the plate spring 33 is supported in the region of its external circumference on an annular corrugation 37 of the clutch cover 5 coaxially enclosing the rotation axis 3. On the side of the retaining bolts 27 radially remote from the rotation axis 3, wire rings 39, 41 are arranged axially between the retaining head 29 and the diaphragm spring 13 for the one part and axially between the diaphragm spring 13 and the clutch cover 5 for the other. The wire rings 39, 41 hold the plate part 17 of the diaphragm spring 13 tiltably between them.

When the clutch is engaged the diaphragm spring 13 clamps the presser plate 7, through the clutch disc 9, against the fly-wheel 1. The plate part 17 of the diaphragm spring 13 here lies with its external circumference on the presser plate 7 and with its internal circumference through the wire ring 41 against the clutch cover 5. For the disengagement of the clutch a release 43 acting on the radially inner ends of the spring tongues 19 moves the spring tongues 19 towards the fly-wheel 1 against the spring force of the annular plate part 17. The supporting of the annular plate part 17 changes from the wire ring 41 to the wire ring 39 and is transmitted through the retaining bolts 27 and the plate spring 33 to the clutch cover 5. At the same time the external circumference of the annular plate part 17 moves axially away from the fly-wheel 1 and the clutch disc 9 is relieved of load.

The stress of the plate spring 33 is made so large that in every operational situation it can hold the diaphragm spring 13 without play between the wire rings 39, 41, that is to say no idle travel takes place in the transference of the application force from one wire ring to the other. In operation the stress of the plate spring 33 varies by wear at the points of contact of the wire rings 39, 41 and the diaphragm spring 13 for the one part and the wire rings 39, 41 and the retaining head 29 and the clutch cover 5 for the other part. The stress of the plate spring 33 must be so selected that even at maximum wear it still suffices for a play-free mounting of the diaphragm spring 13. In other words this signifies that the stress force of the plate spring 33 must be made greater initially so that it has an adequately large value even after wear of the clamping position.

The behavior of the parts clamping the diaphragm spring 13 can be influenced by suitable selection of the spring force-spring travel characteristic curve of the plate spring 33. In a first variant the plate spring 33 can be formed so that it has a spring force increasing constantly with increasing spring travel. In the case of such a characteristic curve a compromise must be found between the requirement to increase the spring force initially so far that in the case of wear of the clamping parts it has a sufficiently great value, and the requirement not to make this initial spring force value too great, since excessively great clamping forces increase the friction of the diaphragm spring 13 at the clamping parts. Excessive friction at the clamping parts effects a hysteresis of the engagement and disengagement actions of the friction clutch. In the example of embodiment according to FIGS. 1 and 2 the hysteresis is reduced by the fact that the plate spring 33 is supported at a position, namely the corrugation 37 of the clutch cover 5, which lies closer to the external circumference of the clutch cover 5, which is stiffened by the fly-wheel 1, than does the supporting point of the diaphragm spring 13 on the clutch cover 5, defined by the wire ring 41. When the clutch is engaged the region of the clutch cover 5 radially adjoining the corrugation 37 towards the rotation axis 3 is deformed, by reason of the stress of the diaphragm spring 13, axially away from the fly-wheel 1 to the right in FIG. 1, while the contact zone of the plate spring 33 formed by the corrugation 37 remains substantially stationery in the axial direction. The axial deformation of the contact region of the diaphragm spring 13 thus reduces the stress of the plate spring 33, when the clutch is engaged, and thus the clamping force responsible for the hysteresis, at least for a partial region of the clutch engagement and disengagement travel of the diaphragm spring 13. Thus the hysteresis behavior is improved, without however the necessity of accepting a reduction of the clamping force with the clutch engaged, which is unacceptable in the case of wear.

The diaphragm spring 13 ordinarily has "super-elevated" spring force-spring travel characteristic curve, that is to say a characteristic curve in which the spring force firstly increases with increasing spring travel, then after passing through a maximum decreases again with the spring travel continuing to increase, before it increases again, after passing through a minimum, with spring travel still further increasing. The plate spring 33 can likewise be dimensioned for a "super-elevated" characteristic curve. Due to this dimensioning the force with which the diaphragm spring 13 is braced in between the wire rings 39, 41 can be adapted to the stress force of the diaphragm spring 13 which varies in the case of wear of the friction linings 11 of the clutch disc 9. The diaphragm spring 13 and the plate spring 33 are installed with a stress at which the spring force reduces with increasing spring travel in accordance with the above-explained super-elevated characteristic curve. Accordingly when the friction linings 11 are worn the stress of the diaphragm spring 13 increases, which necessitates an increased stress force of the plate spring 33 if the clamping in of the diaphragm spring 13 is to remain free from play. Since the plate spring 33 likewise has a super-elevated characteristic curve, the wear of the clamping parts, for example of the wire rings 39, 41 and the parts resting thereon, occurring simultaneously with the wear of the friction linings 11, effects a reduction of the spring travel of the plate spring 33 and thus likewise an increase of the stress force.

Methods for influencing the spring characteristic curve of a plate spring are known. By way of example the spring characteristic curve can be influenced by suitable dimensioning of the ratio of height to thickness of the plate spring or by suitable shaping, for example concentric corrugations or the like.

Variants of the friction clutch according to FIGS. 1 and 2 are to be explained below. Parts of like effect are provided with the reference numerals according to FIGS. 1 and 2 but for distinction with an additional letter. For explanation reference is made to the description of FIGS. 1 and 2.

In FIG. 1 the retaining bolts 27 are riveted directly to the plate part of the plate spring 33. In the case of a variation of spring travel, for example by reason of wear at the clamping point of the clamping point of the diaphragm spring 13, this leads to a tilting of the retaining bolts in relation to the rotation axis 3 and under unfavorable conditions can influence the engagement and disengagement properties of the clutch.

FIG. 3 shows a variant of a plate spring 33a in which the retaining bolts 27a are riveted to tabs 45 which protrude radially inwards from the internal circumference of the plate spring 33a. The tabs 45 permit a limitedly flexurely soft securing of the retaining bolts 27a and render possible displacements of the retaining bolts 27a parallel with the axis of rotation of the clutch.

In FIG. 1 the plate spring 33 is centered on the clutch cover 5 by means of the retaining bolts 27. FIG. 4 shows a variant in which the clutch cover 5b has the form of a cone 47 in the region radially overlapping with the plate spring 33b. The plate spring 33b lies against the radially outer region of the cone 47 and extends at an axial distance therefrom in the radially inner region of the cone. Moreover the plate spring 33b is substantially flat and arranged perpendicularly of the axis of rotation of the clutch in order to achieve a displacement substantially parallel to the axis of rotation of the clutch, of the retaining bolts 27b provided for supporting the diaphragm spring 13b. The centering of the retaining bolts 27b on the clutch cover 5b takes place through the plate spring 33b, the external circumference 49 of which is radially centered on a centering collar 51. The centering collar 51 is formed by embossing on the clutch cover 5b and does not have to extend over the entire circumference of the plate spring 33b. The centering collar 51 can also be formed by bending or by punched-out tabs. The openings 31b provided in the clutch cover 5b for the passage of the retaining bolts 27b are of such large dimensions that the retaining-bolts 27b are displaceable in the openings 31b without friction. This increases the efficiency of the clutch.

In FIG. 5 the plate spring 33c, in contrast to FIG. 4, is centered radially with its internal circumference on a centering collar 53 bent over axially from the internal circumference of the clutch cover 5c. The retaining bolts 27c provided for the clamping of the diaphragm spring 13c are again centered on the clutch cover 5c through the plate spring 33c, while the openings 31c provided for the passage of the retaining bolts 27c in the clutch cover 5c are again made so large that they permit friction-free displacement of the retaining bolts 27c. The plate spring 33c is supported with its external circumference on the clutch cover 5c. In contrast to FIG. 4 the clutch cover 5c is flat in the region overlapping with the plate spring 33c and extends perpendicularly of the axis of rotation of the clutch, while the plate spring 33c has a conical form. The plate spring 33c is provided with an annularly surrounding corrugation 53 which increases the spring force of the plate spring 33c.

Figure 6:
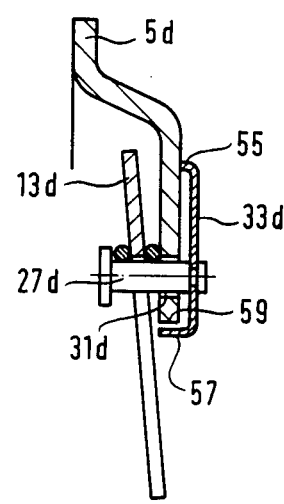

FIG. 6 shows a variant in which the clutch cover 5d and the plate spring 33d are substantially flat and extend parallel with one another and approximately perpendicularly of the rotation axis of the clutch, in the region where these parts radially overlap one another. The plate spring 33d has an axially bent over support edge 55 on its external circumference with which it is supported on the clutchcover 5d and which holds it at an axial distance from the clutch cover 5d. On its internal circumference the plate spring 33d has a centering edge 57 which engages in an internal opening 59 of the clutch cover 5d and centers the plate spring 33d in relation to the clutch cover 5d. In this form of embodiment again the retaining bolts 27d provided for the clamping of the diaphragm spring 13d are centered on the clutch cover 5d by means of the plate spring 33d. The passage openings 31d again permit friction-free passage of the retaining bolts 27d through the clutch cover 5d.

Figure 7:
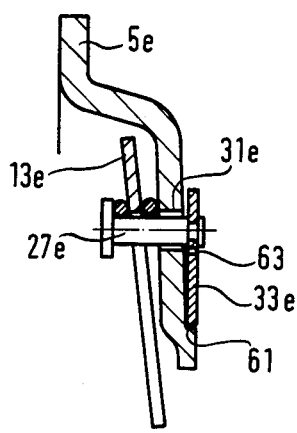
Figure 8:
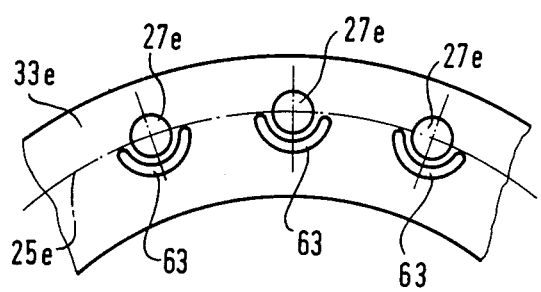
FIG. 8 shows a partial plan view of a plate spring used in the clutch according to FIG. 7.

FIGS. 7 and 8 show details of a variant of a friction clutch in which the plate spring 33e provided to clamp in the diaphragm spring 13e is supported on the clutch cover 5e on the side of the retaining bolts 27e radially facing the axis of rotation of the clutch, in contrast to the embodiments as explained above. This measure permits the use of smaller plate springs and thus a more costfavorable production of the friction clutch. The retaining bolts 27e are again centered by the plate spring 33e on the clutch cover 5e, which for this purpose is provided with a centering edge 61 in the region of its internal circumference. The passage openings 31e for the retaining bolts 27e in the clutch cover 5e are again of such large dimensions that they permit friction-free displacement of the retaining bolts 27e. For a securing of the retaining bolts 27e on the plate spring 33e which is flexible within certain limits the plate spring 33e is provided, on the side of each retaining bolt 27e adjacent to the rotation axis of the clutch, with clearance openings 63 formed as semicircular slots which enclose the retaining bolt 27e and reach as far as the pitch circle 25e. The clearance openings 63 in the case of wear at the clamping position permit a tilting movement of the retaining bolts 27e in relation to the plate spring 33e and thus a displacement substantially parallel with the axis.

Instead of with the aid of clearance openings 63, the retaining bolts 27e can also be secured with the aid of tabs, similar to the tabs 45 in FIG. 3, on the external circumference of the plate spring 33e. Securing by means of tabs or clearance openings is also usable in the variants according to FIGS. 4 to 6. In so far as there is mention above of centering edges or the like for the radial centering or the axial spacing of the securing points of the retaining bolts and the plate springs, in place of continuous edges or added portions it is also possible to provide dogs or tabs or the like.

While a specific embodiment of the invention has been shown and described in detail to illustrate the application of the inventive principles, it will be understood that the invention may be embodied otherwise without departing such principles.

What I claim is:
1. A friction clutch, comprising
   (a) a flywheel rotatable about a rotation axis,
   (b) a clutch cover secured to the fly-wheel,

(c) a presser plate guided non-rotatably but axially movably in relation to the fly-wheel, (d) a clutch disc arranged axially between the flywheel and the presser plate, (e) a diaphragm spring substantially of annular disc form clamped in between the clutch cover and the presser plate, which spring abuts in the region of its external circumference on the presser plate, (f) an annular, axially acting plate spring coaxially surrounding the rotation axis and being arranged on the side of the clutch cover axially remote from the diaphragm spring, (g) several retaining bolts arranged radially within the external circumference of the diaphragm spring on a circle concentric with the rotation axis with spacing from one another and movable in relation to the diaphragm spring and the clutch cover substantially in the direction of the rotation axis, each of said retaining bolts being supported with a first end on the side of the diaphragm spring facing axially towards the presser plate and with a second end through said plate spring on the side of the clutch cover axially remote from the diaphragm spring, all of the retaining bolts being secured in common to the plate spring.

2. A friction clutch according to claim 1, wherein the second ends of the retaining bolts are riveted with the plate spring.

3. A friction clutch according to claim 1, wherein the plate spring is independently centered radially on the clutch cover and the retaining bolts are conducted with radial clearance through openings of the clutch cover.

4. A friction clutch according to claim 3, wherein a centering edge radially guiding the plate spring on one of its circumferential edges is formed by embossing or bending on the clutch cover.

5. A friction clutch according to claim 3, wherein on the internal circumference of the plate spring there is formed by bending a centering edge which is guided radially on an edge, facing the rotation axis, of a central opening of the clutch cover.

6. A friction clutch according to claim 1, wherein on the clutch cover there is formed an annular abutment region protruding axially towards the plate spring, which abutment region holds the plate spring at an axial distance from the clutch cover in the region of the circle of arrangement of the retaining bolts.

7. A friction clutch according to claim 6, wherein the abutment region is formed by an annular corrugation of the clutch cover.

8. A friction clutch according to claim 7, wherein the plate spring and the clutch cover extend substantially parallel with one another in the overlapping region radially laterally of the abutment region.

9. A friction clutch according to claim 6, wherein the clutch cover is made conical to form the abutment region in the region radially overlapping with the plate spring.

10. A friction clutch according to claim 1, wherein the plate spring carries on its circumferential edge supported on the clutch cover abutment means which hold the plate spring axially spaced from the clutch cover in the region of the circle of arrangement of the retaining bolts.

11. A friction clutch according to claim 1, wherein the plate spring carries tabs arranged with spacing from one another in the circumferential direction and protruding substantially radially from one of its circumferential edges, on which tabs the retaining bolts are secured.

12. A friction clutch according to claim 1, wherein the plate spring comprises clearance openings extending partially around the securing points of the retaining bolts.

13. A friction clutch according to claim 12, wherein the clearance openings are formed as substantially semicircular slots which surround the securing points of the retaining bolts on the side radially adjacent to the abutment region between the plate spring and the clutch cover.

14. A friction clutch according to claim 1, wherein the plate spring is supported with its internal circumference on the clutch cover.

15. A friction clutch according to claim 1, wherein the plate spring is for itIs part supported on the clutch cover with its external circumference radially outside and at a distance from a circle along which the diaphragm spring is supported on the clutch cover.

16. A friction clutch according to claim 1, wherein both the diaphragm spring and the plate spring have a super-elevated spring force-spring travel characteristic curve in which the spring force reduces with increasing spring travel in a partial zone of the spring travel, and wherein the diaphragm spring and the plate spring are initially stressed so that variations of the spring travel caused by wear lie in this partial zone of the characteristic curve.

* * * * *